F. MLADINICH.
UNIVERSAL CLINOMETER.
APPLICATION FILED SEPT. 29, 1917.
1,258,597.
Patented Mar. 5, 1918.
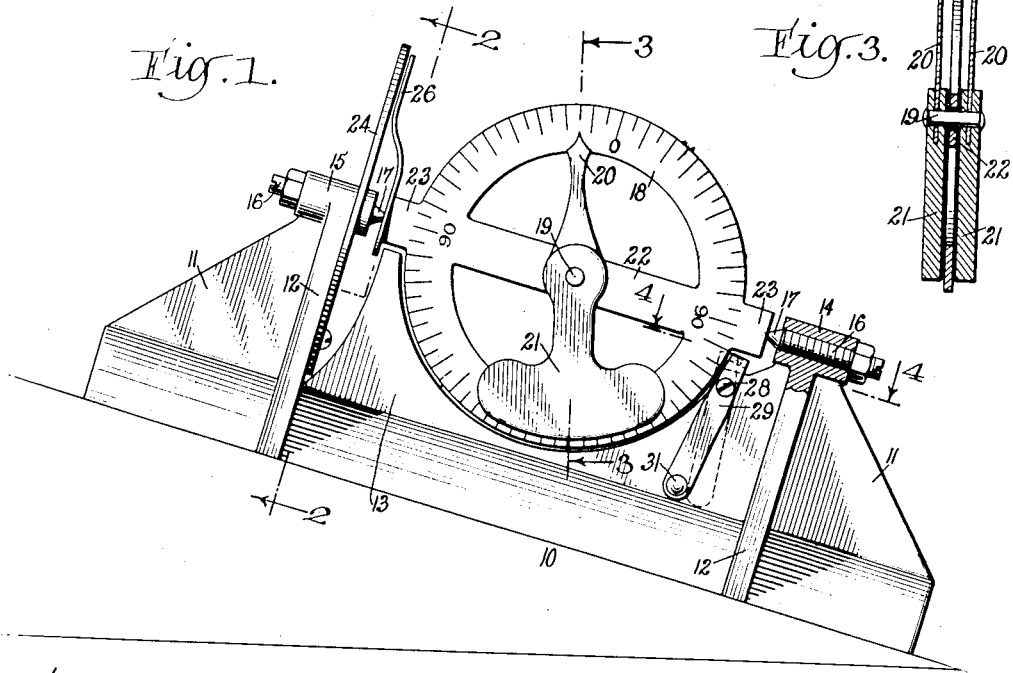
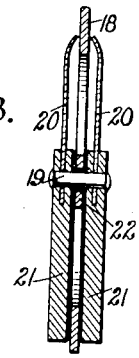
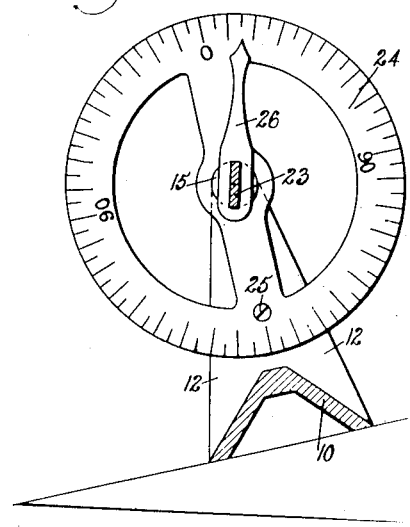
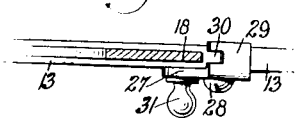
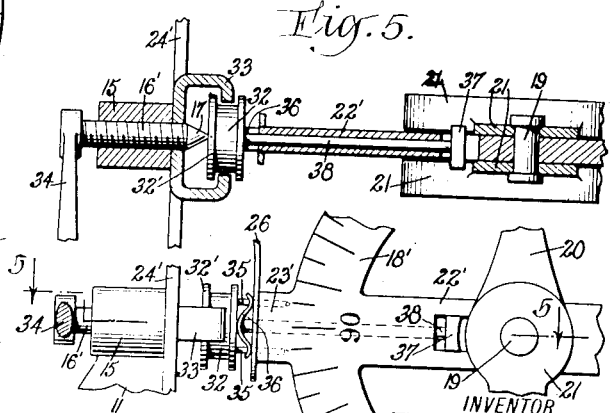
WITNESSES
Frederick Diehl.
Geo. L. Beeler
INVENTOR
F. Mladinich
BY 
ATTORNEYS

UNITED STATES PATENT OFFICE.

FRANK MLADINICH, OF NEW YORK, N. Y., ASSIGNOR OF ONE-HALF TO AUGUSTUS R. DE TARTAS, OF ROCKVILLE CENTER, NEW YORK.

UNIVERSAL CLINOMETER.

1,258,597.      Specification of Letters Patent.      Patented Mar. 5, 1918.

Application filed September 29, 1917. Serial No. 193,964.

*To all whom it may concern:*

Be it known that I, FRANK MLADINICH, a citizen of Servia, but having declared my intention to become a citizen of the United States, and a resident of the city of New York, borough of the Bronx, county of Bronx, and State of New York, have invented a new and Improved Universal Clinometer, of which the following is a full, clear, and exact description.

This invention relates to instruments of precision and has particular reference to devices for indicating the slant, slope or inclination of surfaces or objects with respect to the horizontal or vertical.

Among the objects of this invention is to provide an instrument, broadly in the nature of a spirit level, adapted to be applied to any surface, whether horizontal or inclined at any angle thereto, so as to indicate directly to the operator the angle or pitch of the surface to which the device is applied.

More specifically the main purpose of the invention is to provide a clinometer that may be applied upon or against any surface, such for example as an overhead surface or a part of a machine or other device that is ordinarily inaccessible for use therewith of a spirit level or a clinometer as heretofore made.

A further object of the invention is to provide an instrument of the character indicated including a base and having pivoted therein or thereto a combined dial and pointer device, the dial having a pointer coöperating with an auxiliary dial arranged in a plane perpendicular to the axis of the pivoted dial, and the first mentioned dial having pivoted thereon a pointer movable around an axis perpendicular to the axis around which the dial is pivoted.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a side elevation showing the application of my improvement to a surface inclined at an angle of 15 degrees from horizontal.

Fig. 2 is a vertical transverse section through the device on substantially the broken line 2—2 of Fig. 1 and indicating the manner of operation of the auxiliary dial.

Fig. 3 is a vertical transverse section on the line 3—3 of Fig. 1.

Fig. 4 is a horizontal sectional detail of a portion of the pivoted dial and the locking device therefor, the section being on the line 4—4 of Fig. 1.

Fig. 5 is a sectional detail of a modified form of the invention on the line 5—5 of Fig. 6; and Fig. 6 is a side elevation of the same.

Referring now more specifically to the drawings I show my invention as comprising a strong rigid base 10, preferably of angle construction in cross section as shown in Fig. 2 but having a flat bottom or an edge adapted to rest squarely upon a flat surface. The base also includes upwardly projecting longitudinal and transverse webs 11 and 12 respectively, adjacent to the ends of the base and having at the central portion a longitudinal web 13. The ends webs 11 and 12 constitute in effect a pair of pedestals having heads 14 and 15 in which are fitted supporting screws 16 in co-axial alinement with each other and having conical bearing points 17 directed toward each other.

18 indicates a circular dial having degree graduations on either or both faces thereof and having pivoted to its center at 19 one or two pointers 20 coöperating with the graduations. I preferably employ two of these pointers as indicated in Figs. 1 and 3 coöperating with the opposite faces of the dial. To each of these pointers is rigidly connected a pendulum 21. These pendulums and pointers may be severally journaled freely upon the pivot 19 or preferably they are both fixed to the pivot so as to rotate therewith within the dial bar 22. The dial has end lugs 23 diametrically opposite each other and into these lugs project the conical bearing points 17 of the screws 16. The axis of the screws may be regarded, for the sake of description, as the horizontal axis of the dial 18 and this axis is perpendicular to and intersects the transverse axis of the pivot 19. The two pendulums 21 coöperate with each other and serve two direct purposes as follows: First, to hold the dial 18 always in a vertical plane, the dial being free to rotate around its horizontal axis under the action of the pendulums. Secondly, the pendulums serve to hold the pointers 20 to the vertical irrespective of the inclination of the axis of the dial. Given then the problem to ascertain the inclination of any longitudinal surface the base 10 is applied directly thereto and with the dial 18 free to rotate around its axis, the dial itself will assume a vertical position as will also the pointers 20 giving a correct reading on either face of the dial of the inclination of the surface with respect to the horizontal. If the surface being tested is overhead or accessible only by reaching under or beneath the same, the process of determining its inclination is substantially as before indicated. The base 10 is simply inverted and when applied directly to the surface the dial will assume the same position as before stated, the base having turned relatively around the horizontal axis of the dial, the latter being held by the action of the pendulums from rotation while the base is being inverted.

24 indicates an auxiliary dial fixed as by means of a screw or the like 25 to one of the pedestals concentric with and perpendicular to one of the screws 16 and hence concentric with the axis of the dial 18. A pointer 26 is fixed to one of the end lugs 23 of the dial 18 and coöperates directly with the graduations formed on the face of the auxiliary dial. The dial 24 being fixed to the base and the pointer 26 being fixed to the rotatable dial 18, it follows that if it is desired to ascertain the degree of inclination of a surface transversely of the base or to determine whether a certain surface is plumb the base will be applied against such surface as indicated in Fig. 2 and the correct reading of the inclination will be given on the face of the dial 24. The illustration given is that of an inclination of 15 degrees from the horizontal. If, however, the surface were vertical the application of the base would be exactly the same and the pointer would indicate 90 degrees. It will be appreciated furthermore that the instrument as submitted may be employed to give two readings at the same time, as for instance when it is desired to ascertain the longitudinal and transverse inclinations of the same object or surface. In other words the two characters of readings indicated in Figs. 1 and 2 may be made at the same time, that is to say, a surface may have longitudinally a certain inclination and transversely a similar or a different inclination and each reading will be accurate irrespective of the reading of the other due to the fact that the reading for one inclination results from a pointer pivoted upon the dial which in itself is pivoted, while the other reading is had from a relatively fixed dial over which a pointer operates that is carried by the movable dial.

If it is desired at any time to lock the dial 18 from rotation around its axis it may be held from such movement by means of a lock such as indicated at 27. This lock comprises a lever of the first class pivoted at 28 on the central longitudinal web 13 adjacent to one edge of the dial and having an end portion 29 turning at right angles to the main portion of the lever and having a notch 30 whereby when the lever 27 is turned slightly around its pivot by application of the finger to the finger piece 31 the notched end 29 will straddle the edge of the dial as indicated in dotted lines in Fig. 1 and hold the dial from rotation.

I call attention now to Figs. 5 and 6. It will be seen that one of the bearing cups 32 is movably connected to said dial. This cup is in the nature of a cylindrical brake hub having a friction flange 32' adapted to bear frictionally against a yoke 33 fixed to or formed as a part of the auxiliary dial 24'. The screw 16' coöperating with this bearing cup or hub 32 may be provided with a quick pitch thread whereby when the handle 34 thereof is actuated the point 17 of the screw will force the hub 32 toward the pivot axis 19 of the pointers 20 and bring the flange 32' into contact with the points of the yoke 33 thus locking the dial 18' from rotation around its longitudinal axis. The hub 32 while free to move longitudinally of the last mentioned axis is held from relative rotation with respect to the dial 18' by means of dowels 35, or their equivalent, shown as projecting from the hub into the lug 23' of the dial 18'. A light leaf spring 36 is employed between the hub 32 and the lug 23' which serves the purpose of keeping the cup portion of this hub in proper coöperative engagement with the cone point 17 when the screw 16' is loosened, and this fact insures that when the lock or brake is released there shall be no frictional resistance to the necessary free rotation of the dial 18' around its longitudinal axis. I also provide means for locking the pointers 20 from rotation around their axis 19. 37 indicates a shoe arranged close to the cylindrical hub portions of the pendulums 21 and adapted to act as a friction brake thereon by any suitable operating means brought into action simultaneously with the setting of the brake at 32, 33. For this purpose a stem 38 extends between the shoe 37 and the hub 32 whereby the movement of the hub causes a similar movement of the shoe. A single simple adjustment of the screw 16' therefore serves to lock all rotative parts of the device simultaneously. The action of the screw furthermore in locking these various parts is accomplished without any tendency on the part of the screw to cause undesired rotation of any part. This feature of the invention is useful for the taking of readings of the interiors of machines or other structures or where it is inexpedient to read the indications on the dials while the instrument is in position. For instance if it is desired to determine the inclination of a part of a machine in a secluded place, the device is applied thereto and while so applied the handle 34 is rotated to lock the pointers in the position determined according to the inclination. With the parts thus locked the instrument as a whole is removed and brought into a position where it may be read with respect to either or both of the dials. The stem 38 is shown fitted slidably in the cross bar 22' of the dial 18' but obviously the stem or plunger means between the hub 32 and the shoes 37 may be variously mounted.

I claim:

1. In a clinometer, the combination of a base, a dial pivoted thereto for free rotation around a longitudinal axis, pendulum indicator means pivoted to the dial and serving to indicate degrees of inclination of the base in one direction and also maintaining the dial in a vertical plane, and auxiliary dial and pointed devices, one of these devices being carried by the first mentioned dial and rotatable therewith around the axis of the first mentioned dial and the other of said devices being fixed to the base, the plane of the auxiliary dial being perpendicular to the axis of the first mentioned dial, said auxiliary dial and its pointer serving to indicate degrees of inclination of the base in a direction transverse to the direction in which the readings are taken from the first mentioned dial.

2. In a clinometer, the combination of a base, a dial pivoted thereto for free rotation around a longitudinal axis, an auxiliary dial fixed to the base and lying in a plane perpendicular to the axis of the first mentioned dial, means connected to the first mentioned dial to maintain the same in a vertical plane irrespective of the inclination of the base, and a pointer carried by the first mentioned dial and coöperating with the auxiliary dial, substantially as set forth.

3. In a clinometer, the combination of a base, a dial pivoted therein for free rotation around a longitudinal axis parallel to the base, pendulum indicator means pivoted to the dial, and serving to indicate degrees of inclination of the base in one direction and also maintain the dial in a vertical plane, an auxiliary dial carried by the base with its center coinciding with the axis of the first mentioned dial, and a pointer fixed to the first mentioned dial and and coöperating with the auxiliary dial, the point of the pointer being held in the plane of the dial aforesaid and serving in coöperation with the auxiliary dial to indicate degrees of inclination of the base in a direction transverse to the direction in which the readings are taken from the first mentioned dial.

FRANK MLADINICH.